United States Patent [19]

Durler

[11] Patent Number: 5,181,801
[45] Date of Patent: Jan. 26, 1993

[54] DEVICE FOR ACTUATING A TILTING LEVER USED IN SENSING SHEET-TYPE RECORDING MEDIA

[75] Inventor: Egon Durler, Mönchweiler, Fed. Rep. of Germany

[73] Assignee: Mannesmann Aktiengesellschaft, Dusseldorf, Fed. Rep. of Germany

[21] Appl. No.: 595,612

[22] Filed: Oct. 11, 1990

[30] Foreign Application Priority Data

Oct. 11, 1989 [DE] Fed. Rep. of Germany ....... 3934398

[51] Int. Cl.⁵ .............................................. B41J 29/42
[52] U.S. Cl. .................... 400/708; 400/705; 271/265
[58] Field of Search ..................... 400/705, 705.3, 708, 400/708.1, 320, 55, 59; 271/258, 261, 263, 265; 200/404

[56] References Cited

U.S. PATENT DOCUMENTS

| 4,141,660 | 2/1979 | Bommersheim et al. | 400/708 |
| 4,296,394 | 10/1981 | Ragheb | 200/404 |
| 4,509,426 | 4/1985 | Hardin | 101/DIG. 38 |
| 4,595,936 | 6/1986 | Nakajima et al. | 400/320 |
| 4,676,675 | 6/1987 | Suzuki et al. | 400/59 |
| 4,881,840 | 11/1989 | Rendon et al. | 400/708 |

FOREIGN PATENT DOCUMENTS

| 84985 | 7/1981 | Japan | 400/708 |
| 152985 | 9/1982 | Japan | 400/708 |
| 10478 | 1/1986 | Japan | 400/708 |

Primary Examiner—Edgar S. Burr
Assistant Examiner—Ren Yan
Attorney, Agent, or Firm—Cohen, Pontani, Lieberman, Pavane

[57] ABSTRACT

A device for actuating a tilting lever used in sensing sheet-type recording media includes a tilting lever having first and second arms and being swingably mounted about a pivot axis attached to a frame, from a first reference position to a second reference position. A first permanent magnet cooperates with a magnetized contact region on the first tilting-lever arm and is arranged to rest against the magnetized contact region when the first arm is in the first reference position. A second permanent magnet cooperates with a further magnetized contact region on the second arm and is arranged to rest against the further contact region when the second arm is in the second reference position. The respective distances from the first and second permanent magnets to the pivot axis is selected such that unequal torques of sufficiently large magnitude exist between the permanent magnets and their associated arms such that the tilting lever can be displaced from at least one of the reference positions by a slight driving force and abruptly shifted to the other reference position.

10 Claims, 3 Drawing Sheets

DEVICE FOR ACTUATING A TILTING LEVER USED IN SENSING SHEET-TYPE RECORDING MEDIA

BACKGROUND AND SUMMARY OF THE INVENTION

The present invention relates to a device for actuating a tilting lever used in sensing sheet-type recording media in document-processing apparatus. In such a device, by means of driving one tilting-lever arm, the tilting lever can be swung about a pivot axis attached to a frame from a first reference position into a second reference position.

Devices of the foregoing type are used in place of paper-thickness sensors. Specifically, in cases where the thickness of a paper stock is not to be determined because, for example, only one piece at a time need be handled in a controlled manner, the presence of a second piece, for example, is not measured but the beginning of the paper strip is measured in order to establish the first line of printing.

In accordance with the prior art, sensing takes place most simply in a purely mechanical manner, with levers and a microswitch (DE-Z Elektronik 1970, No. 1, page 12). This procedure, however, requires an unusually high precision in the case of very thin paper and films, for which reason electromechanical pickups should be more suitable.

From the standpoint of the foregoing prior art, such devices are necessary in multiform printers such as, for example, the Mannesmann-Kienzle D 217 printer. Such printers are used as bank equipment, savings passbook printers or the like. In such printers, the material to be printed on is laid, for example, against a right-hand stop so that sensing of the left edge takes place either by means of movement of the material to be printed on or by means of movement of a carriage supporting or traveling above the material to be printed on. Since such a carriage also supports a print head with print elements, a sensor signal actuated by the paper edge is also used for the beginning of printing.

Known tilting-lever mechanisms are usually realized with springs of the most varied form, the spring tilting via a fulcrum. This principle, however, is subject to the spring having a force corresponding to the distance from the fulcrum, so that there results a spring characteristic with a torque that declines only belatedly and then slowly in relation to the rotation angle of the spring-loaded lever against which the paper edge pushes. For this lever-spring principle it is thus disadvantageous (i) that the actuation force for the lever increases until the tilting of the lever; further, (ii) that the forces and thus the friction on the fulcrum are large as a result of the initial action angle of the spring, making the system sluggish; and (iii) that the arrangement takes up a large amount of space.

It is, therefore, an object of the invention to create an exact switching point even for the lightest weights of paper, which can exert only very slight actuation forces, with abrupt tilting of the lever taking place and therefore a faster system being created.

The foregoing object is achieved in a device according to the invention in which a tilting lever that can be magnetized at least in contact regions is swingably mounted in such a manner that a first tilting-lever arm in a first reference position rests against a first permanent magnet, and in which a second tilting-lever arm in a second reference position rests against a second permanent magnet. The distances from the two permanent magnets to the pivot axis in each case are selected such that unequally large torques exist between the permanent magnets and the tilting-lever arm in each case, in the sense that at least one of the reference positions can be canceled by a smallest possible driving force, and the tilting lever can be abruptly shifted to the other reference position. Via the ratio of the magnet forces as well as their distances from the fulcrum, an abrupt tilting of the tilting lever can advantageously be effected by means of the slightest actuating forces. The device is thus usable even with the thinnest paper, which applies only very slight actuating forces. Furthermore, the system is very fast-acting.

In an embodiment of the invention, the forces of the permanent magnets are selected as a function of the ratio of the pivot axis/first permanent magnet lever arm to the pivot axis/second permanent magnet lever arm, i.e. as a function of the distances. Naturally, switched electromagnets with their magnet core can be used in place of permanent magnets. Moreover, the forces of a permanent magnet are determined in accordance with its dimensions and in accordance with its composite materials.

A special actuation threshold with the additional force of a spring, which is present in any case, and with pulse-like action is achieved in the manner that the first tilting-lever arm in the first reference position rests against the spring-loaded switching element of a microswitch.

A further embodiment of the invention consists in arrangement of the above-described device o the print head carriage of a printer, with the tilting lever being swingably attached parallel to the central plane of motion of the print head carriage and having one tilting-lever arm extending into the path of the recording medium.

The construction of the tilting-lever device for a printer is advantageously undertaken in such a manner that the microswitch is attached to contact the print head carriage on the first tilting-lever arm, and a reset pin is mounted on the print head carriage to contact the second tilting-lever arm. The reset pin is connected to a leg spring and, by means of its end coming in contact with a printer side wall, swings the tilting lever into one reference position.

Further advantages are, moreover, achieved by means of the arrangement of the inventive device on a carriage for an optical reading head or for a magnetic reading or writing device.

BRIEF DESCRIPTION OF THE DRAWINGS

The foregoing and further advantages and features of the invention will become apparent from the following detailed description of the invention when read in conjunction with the accompanying drawing, in which.

DETAILED DESCRIPTION OF THE PROPOSED EMBODIMENTS

Figure 1:
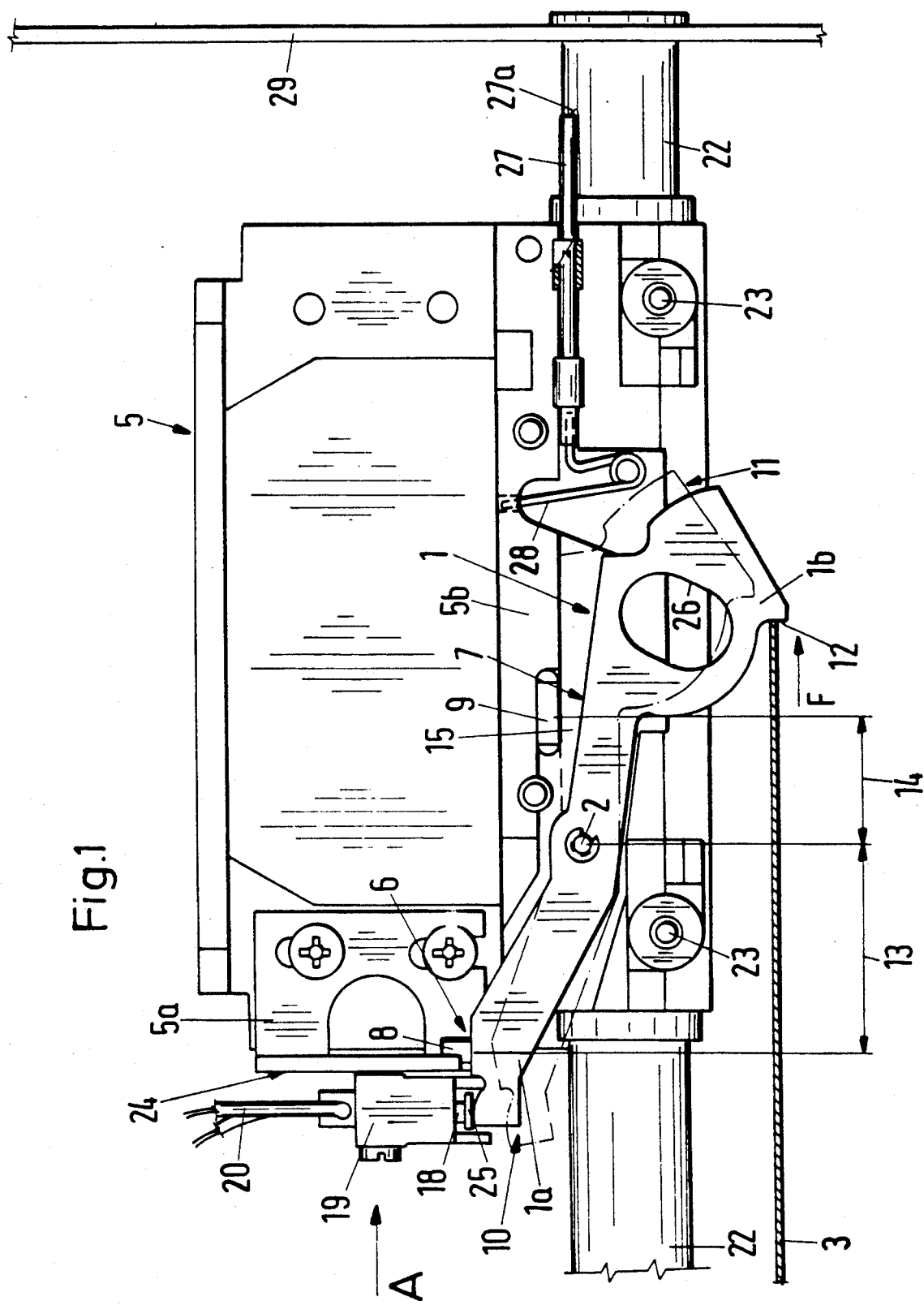
FIG. 1 shows a front view of the device arranged on a print head carriage of a printer.
Figure 2:
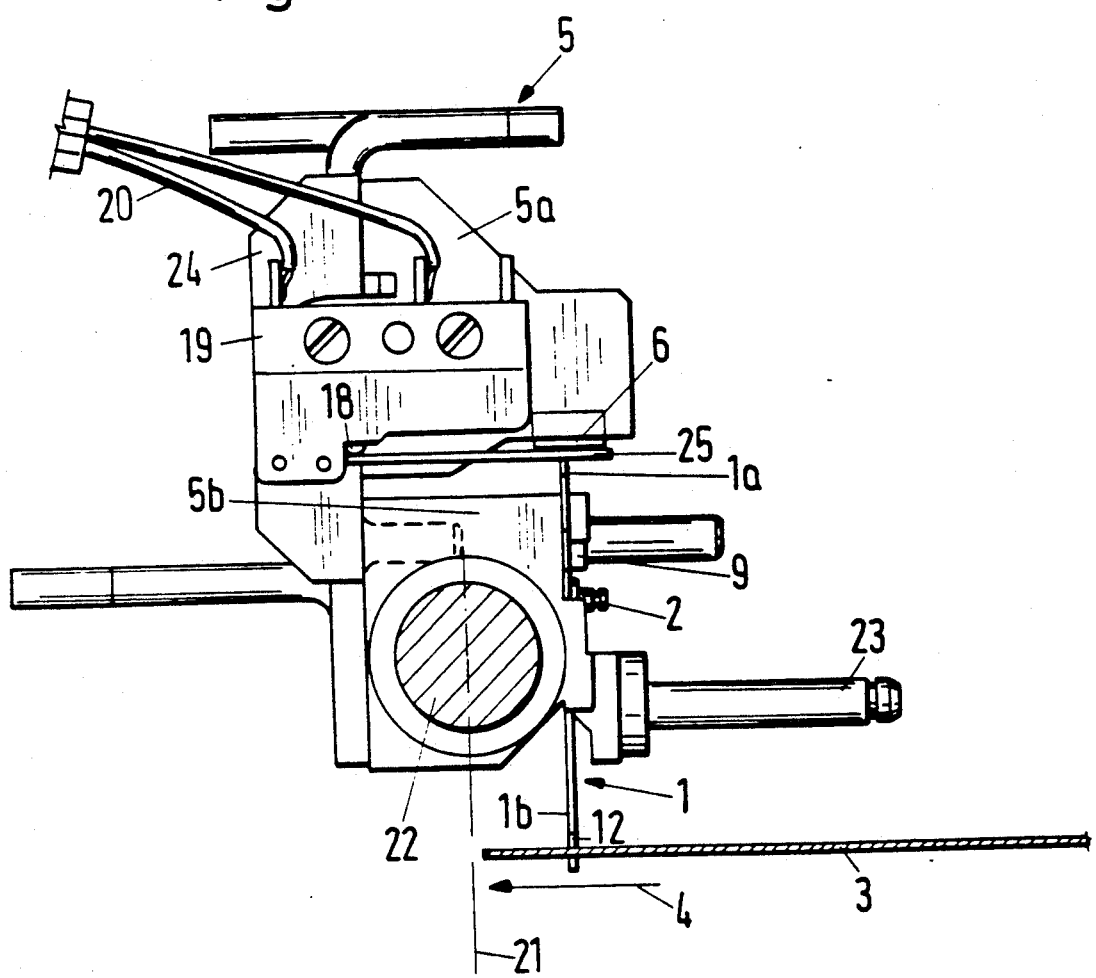
FIG. 2 shows a side view pertaining to FIG. 1 in the direction of the arrow A in FIG. 1.

In accordance with FIG. 1, the inventive device includes a tilting lever 1, which has a first tilting-lever arm 1a and a second tilting-lever arm 1b and is mounted swingably about a pivot axis 2. Against the second tilting-lever arm 1b lies a paper recording medium 3 of any thickness. The direction of advance 4 of the recording medium 3, shown in FIG. 2, runs transverse to a direction of advance of a print head carriage 5 to which the device is attached. Any other frames can take the place of the print head carriage 5.

On the tilting-lever arms 1a and 1b, the tilting lever 1 has metallic contact regions 6 and 7 which can come in contact, respectively, with permanent magnets 8 and 9. Thus, as drawn, the first tilting-lever arm 1a is in a first reference position 10, while in this phase the second tilting-lever arm 1b is outside of a second reference position 11. In the first reference position 10, the tilting-lever arm 1a lies with its contact region 6 against the permanent magnet 8, and in the second reference position 11 the tilting-lever arm 1b lies with its metallic contact region 7 against the permanent magnet 9. A stop surface 12 is outside the path of motion of the recording medium 3 in the reference position 11.

Distances 13 and 14, each measured from the pivot axis 2 to the permanent magnets 8 and 9 respectively, are selected such that, taking into account the force of each permanent magnet 8 or 9, unequally large torques exist between the permanent magnets 8 and 9 respectively and the tilting-lever arm 1a, 1b in each case. The torques are designed such that at least one of the reference positions (10) can be canceled by a smallest possible driving force, "F," for example by the recording medium 3, and the tilting lever 1 can be shifted, as shown, into the other reference position 11. Here it should be noted that the permanent magnet 9 is arranged at such a distance 15 from the contact region 7 that the magnetic field already attempts to attract the tilting-lever arm 1b. The driving force "F" that is lacking here is extremely slight and is applied by the recording medium 3.

It is possible to apply the missing driving force in the manner that the forces of the permanent magnets 8 and 9 respectively are selected as a function of the lever arm ratio of pivot axis 2 to first permanent magnet 8 and of pivot axis 2 to the second permanent magnet 9. Accordingly, the permanent magnets 8 and 9 are to be selected in accordance with the distances 13 and 14. The first tilting-lever arm 1a, brought into contact against a spring-loaded switching element 18 of a microswitch 19 in the first reference position 10, is additionally accelerated by means of the switching element 18 upon the application of the driving force "F", thus increasing the dynamics of the system. The microswitch 19 is provided with trailing wires 20 equipped for the movement of the print head carriage 5.

The inventive device described above is arranged on the print head carriage 5 of a printer, with the tilting lever 1 being attached swingably about the pivot axis 2 and parallel to a central plane of motion 21 (FIG. 2) of the print head carriage 5. The tilting lever 1 has one of the tilting-lever arms 1b projecting transversely into the path, i.e. transverse to the direction of advance 4 of the recording medium 3, as shown by the unbroken lines in FIG. 1.

The print head carriage 5 is guided via a cylindrical longitudinal rod 22 and on transverse rods 23 which are provided with rollers. The permanent magnet 8 is attached to one frame part 5a and the permanent magnet 9 to a corresponding frame part 5b. The microswitch 19 with the switching element 18, which is laterally offset, is arranged on one end 24 of the print head carriage 5, a cantilever arm 25 spanning the distance to the tilting lever 1. The tilting lever 1 is furthermore made in a weight-saving manner by means of a cutout 26.

When a recording medium is being printed on (such as, for example, documents, savings passbooks, checks, etc.), the tilting lever 1 is in the second reference position 11, i.e. in a rest position outside the path of the recording medium 3 without touching said recording medium. In the operating condition, if the paper edge is to be sensed, it is provided that the microswitch 19 attached to the print head carriage 5 is connected to the first tilting-lever arm 1a, and a reset pin 27 mounted on the print head carriage 5 is connected to the second tilting-lever arm 1b, which reset pin is connected to a leg spring 28 and, by its end 27a coming against a printer side wall 29, swings the tilting lever 1 into the reference position 10.

Figure 3:
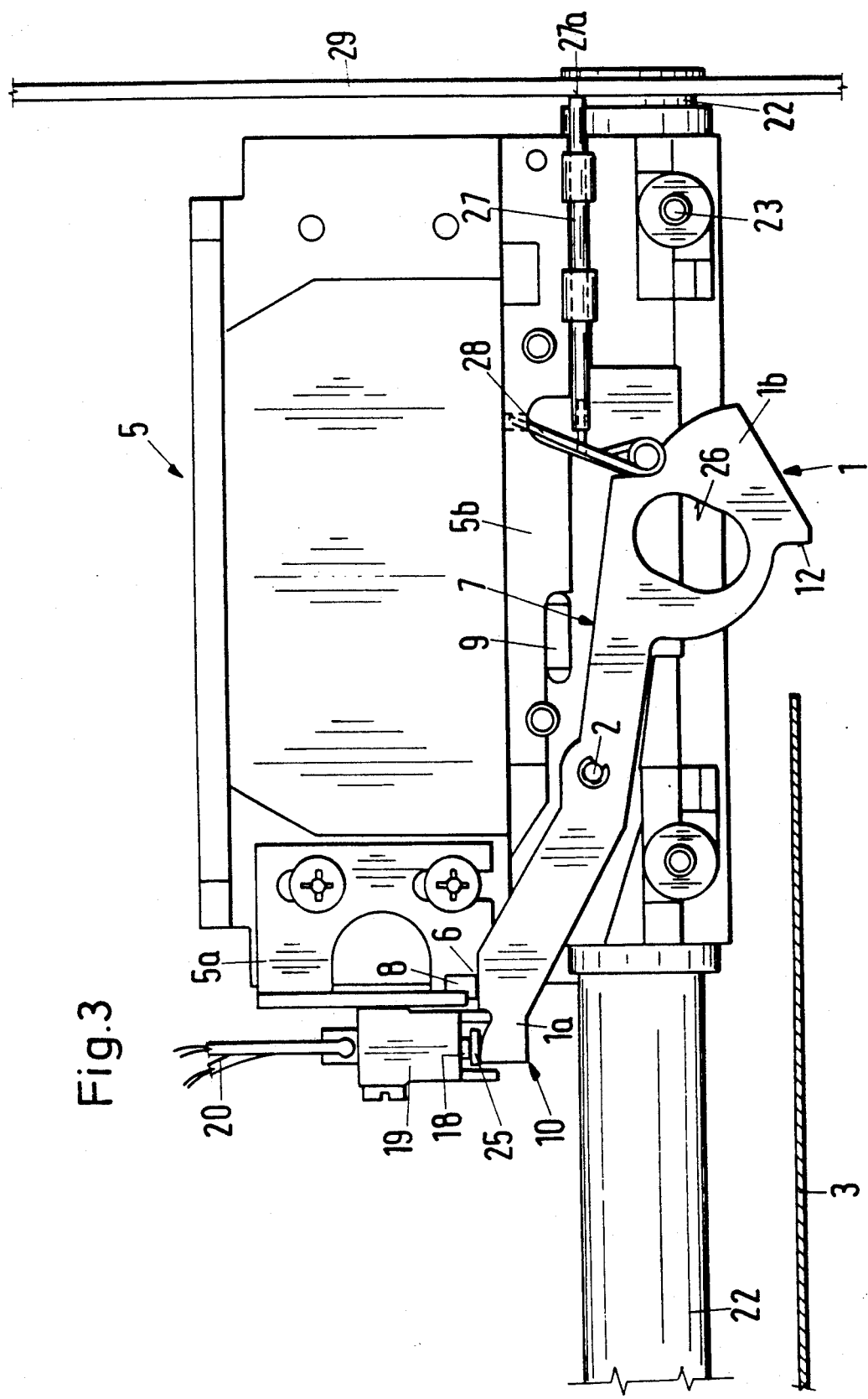
FIG. 3 shows a front view, as in FIG. 1, with a modified position of the print head carriage.

In FIG. 3, the reset pin 27 is in contact with the printer side wall 29, the leg spring 28 pivoting the tilting lever 1 into the reference position 10.

On resetting the tilting lever 1, the signal of the microswitch 19 can simultaneously serve to normalize the print head carriage 5, so that an additional signal transmitter for this function can be saved.

It should be understood that the preferred embodiments and examples described are for illustrative purposes only and are not to be construed as limiting the scope of the present invention which is properly delineated only in the appended claims.

What is claimed is:

1. A device for actuating a tilting lever used in sensing a sheet-type recording medium, comprising:
   a frame;
   a tilting lever having first and second arms extending in a longitudinal direction of said tilting lever and a pivot axis attached to said frame, said tilting lever being swingably mounted about said pivot axis between a first reference position and a second reference position; means directing the sheet-type recording medium in a path which intersects said tilting lever in one of its first or second positions;
   a first permanent magnet having a magnetic force cooperating with a first magnetized contact region on said first tilting-lever arm and arranged to rest against said magnetized contact region when said first tilting-lever arm is in said first reference position; and
   a second permanent magnet having a magnetic force cooperating with a second magnetized contact region on said second tilting-lever arm and arranged to rest against said second contact region when said second tilting-lever arm is in said second reference position,
   wherein the respective distances from said first and second permanent magnets to said pivot axis in longitudinal direction of said tilting lever are selected such that unequal torques of sufficiently large magnitude exist between said first and second permanent magnets and said first and second tilting-lever arms, respectively, such that said tilting lever can be displaced from at least one of said first and second reference positions in responce to a driving force exerted by the sheet-type recording medium on said tilting lever and then shifted to said other reference position.

2. A device according to claim 1, wherein a ratio of magnetic forces between said first permanent magnet and said second permanent magnet and their respective first and second magnetized contact regions is inversely related to a ratio of a distance between said first magnet and said pivot axis to a distance between said second magnet and said pivot axis.

3. A device according to claim 1, further comprising a microswitch with a spring-loaded switching element, said switching element being arranged to rest against said first tilting-lever arm when in said first reference position.

4. A device according to claim 1 in combination with a print head carriage of a printer, comprising a path for feeding the recording medium, said tilting lever being mounted on said print head carriage and swingably attached to a plane parallel to a central plane of motion of said print head carriage and having one of said tilting-lever arms extending into said path of said recording medium.

5. The combination according to claim 4, further comprising:
- a sidewall of said printer;
- a microswitch attached to said print head carriage and arranged to be mechanically coupled to said first tilting-lever arm; and
- a reset pin mounted on said print head carriage and arranged to be mechanically coupled to said second tilting-lever arm, said reset pin being arranged to swing said tilting lever into said first reference position when an end of said reset pin comes into contact with said printer sidewall.

6. A device according to claim 1 in combination with a carriage for an optical reading head on which carriage said device is mounted.

7. A device according to claim 6 in combination with a carriage for a magnetic reading device on which carriage said device is mounted.

8. A device according to claim 1 in combination with a carriage for a magnetic writing device on which carriage said device is mounted.

9. A device for actuating a tilting lever used in sensing a sheet-type recording medium, comprising:
- a print head carriage of a printer, comprising a path for feeding the recording medium and having a sensor;
- a tilting lever having first and second arms and a pivot arms, said tilting lever being mounted on said print head carriage and swingably attached to a plane parallel to a central plane of motion of said print head carriage and having one of said tilting-lever arms extending into said path of said recording medium, having a first reference position and a second reference position;
- a first permanent magnet having a magnetic force cooperating with a first magnetized contact region on said first tilting-lever arm and arranged to rest against said magnetized contact region when said first tilting-lever arm is in said first reference position; and
- a second permanent magnet having a magnetic force cooperating with a second magnetized contact region on said second tilting-lever arm and arranged to rest against said second contact region when said second tilting-lever arm is in said second reference position,
- wherein the respective distances from said first and second permanent magnets to said pivot axis is selected such that unequal torques of sufficiently large magnitude exist between said first and second permanent magnets and said first and second tilting-lever arms, respectively, such that said tilting lever can be displaced from at least one of said first and second reference positions by a driving force exerted by said recording medium on said tilting lever and then shifted to said other reference position and said sensor produces an output indicative of said tilting lever being in said first reference position or said second reference position.

10. The combination according to claim 9, further comprising:
- a sidewall of said printer;
- said sensor comprising a microswitch attached to said print head carriage and arranged to be mechanically coupled to said first tilting-lever arm; and
- a reset pin mounted on said print head carriage and arranged to be mechanically coupled to said second tilting-lever arm, said reset pin being arranged to swing said tilting lever into said first reference position when an end of said reset pin comes into contact with said printer sidewall.

* * * * *